United States Patent
Francke et al.

(10) Patent No.: US 7,676,585 B1
(45) Date of Patent: Mar. 9, 2010

(54) SYSTEM AND METHOD FOR DYNAMICALLY ADJUSTING A REFRESH INTERVAL

(75) Inventors: Andrew J. Francke, Morgan Hill, CA (US); Kelly Muñiz de Francke, Morgan Hill, CA (US); Steven L. Christenson, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 1265 days.

(21) Appl. No.: 10/835,994

(22) Filed: Apr. 29, 2004

(51) Int. Cl.
*G06F 15/16* (2006.01)
*G06F 15/173* (2006.01)
*G06F 15/177* (2006.01)

(52) U.S. Cl. .................. 709/229; 709/217; 709/220; 709/224; 709/225

(58) Field of Classification Search ............... 709/203, 709/207, 223, 217, 220, 224–225, 229
See application file for complete search history.

(56) References Cited

U.S. PATENT DOCUMENTS

| | | | |
|---|---|---|---|
| 5,907,681 A * | 5/1999 | Bates et al. ............ | 709/228 |
| 6,016,508 A * | 1/2000 | Chu et al. .............. | 709/223 |
| 6,061,715 A | 5/2000 | Hawes .................. | 709/203 |
| 6,094,662 A | 7/2000 | Hawes .................. | 707/104 |
| 6,101,510 A | 8/2000 | Stone et al. ............ | 707/313 |
| 6,138,150 A | 10/2000 | Nichols et al. ......... | 709/219 |
| 6,275,858 B1 * | 8/2001 | Bates et al. ............ | 709/228 |
| 6,400,361 B2 | 6/2002 | Toffolo ................. | 345/213 |
| 7,085,932 B1 * | 8/2006 | Morgan, III ............ | 713/182 |
| 7,127,485 B2 * | 10/2006 | Caruso et al. .......... | 709/203 |
| 7,284,062 B2 * | 10/2007 | Krantz et al. .......... | 709/229 |

\* cited by examiner

*Primary Examiner*—Hussein Elchanti
(74) *Attorney, Agent, or Firm*—Baker Botts L.L.P.

(57) ABSTRACT

A method for providing information to a client device includes receiving a first status request from the client device and communicating status information to the client device in response. The status information specifies a first refresh interval. The method also includes detecting an input of the client device and determining a second refresh interval in response to detecting the input. The method further includes receiving a second status request from the client device after the expiration of the first refresh interval and communicating updated status information to the client device in response to the second status request. The updated status information specifies the second refresh interval.

28 Claims, 4 Drawing Sheets

SYSTEM AND METHOD FOR DYNAMICALLY ADJUSTING A REFRESH INTERVAL

TECHNICAL FIELD OF THE INVENTION

This invention relates in general to electronic communications, and more particularly to dynamically adjusting a status information refresh interval.

BACKGROUND OF THE INVENTION

Many web-based applications are designed to monitor the status of a remote component, such as a web-server, and to display the results in near real-time. Such applications often include some mechanism for conveying updated status information from the remote component to the monitoring application. A common technique for updating the status information displayed by the monitoring application is to design the monitoring application to repeatedly query the remote component.

For example, the Hyper-Text Transfer Protocol (HTTP) includes "refresh timer" semantics to inform monitoring applications, such as web browsers, how often to reload status information. Web servers provide configuration files and Application Program Interfaces ("APIs") that can be designed to specify a refresh interval for a particular webpage. When status information is requested by a web browser, the web server specifies this value in the HTTP header information for that webpage. After loading the webpage, the web browser begins timing the refresh interval. When the refresh interval expires, the web browser reloads the webpage to acquire updated information.

When several applications are monitoring a particular web server, the web server may become overwhelmed by status requests if the refresh interval is set too short. On the other hand, if the refresh interval is too long, the information provided by the monitoring applications may become so outdated as to be useless. Furthermore, a user relying on the information may need the information updated more frequently under certain circumstance and less frequently under others.

SUMMARY OF THE INVENTION

In accordance with the present invention, the disadvantages and problems associated with providing status information to terminal devices have been substantially reduced or eliminated. In particular, a method and system are disclosed for providing status information with a dynamically adjusted refresh interval.

In accordance with a particular embodiment of the present invention, a method for providing information to a client device includes receiving a first status request from the client device and communicating status information to the client device in response to the first status request. The status information specifies a first refresh interval. The method also includes detecting an input of the client device and determining a second refresh interval in response to detecting the input. The method further includes receiving a second status request from the client device after the expiration of the first refresh interval and communicating updated status information to the client device in response to the second status request. The updated status information specifies the second refresh interval.

In accordance with another embodiment of the present invention, a method for providing information to a client device includes receiving a first status request from a client device and communicating status information to the client device in response to the first status request. The status information specifies a first refresh interval. The method also includes determining a second refresh interval based on a network load and receiving a second status request from the client device after the expiration of the first refresh interval. The method further includes communicating updated status information to the client device in response to the second status request. The updated status information specifies the second refresh interval.

Technical advantages of certain embodiments of the present invention include a process for providing dynamic refresh intervals that adjust to changing conditions on a communication network.

Other technical advantages of certain embodiments of the present invention include providing a refresh interval that is responsive to user input, providing a refresh interval that adapts to network characteristics, and providing a refresh interval that reflects a user priority of a user of the relevant client device.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
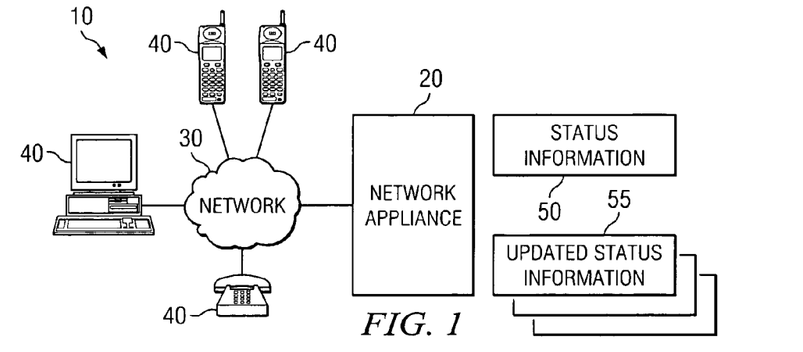
FIG. 1 is a block diagram illustrating a communication system in accordance with a particular embodiment of the present invention.

FIG. 1 illustrates a communication system 10 that includes a network appliance 20, a network 30, and one or more client devices 40. Client devices 40 obtain information from network appliance 20 by requesting status information status information 50 from network appliance 20.

Communication system 10 may employ a "pull", or polling, scheme for providing updated information to client devices 40. For example, in a particular embodiment, communication system 10 may utilize the Hyper-text Transport Protocol (HTTP) that includes "refresh timer" semantics, which network appliance 20 may use to inform client devices 40 how often to refresh status information 50. In such an embodiment, network appliance 20 may indicate a refresh interval value in an HTTP header of status information 50. Client device 40 may then set a timer for the desired refresh interval and reload status information 50 or alternate status information, such as updated status information 55, based on the refresh interval.

By dynamically adjusting the refresh interval transmitted to client devices 40, in response to fluctuations in network activity, changes in status information data, and/or other considerations, network appliance 20 may balance responsiveness and accuracy with scalability. Additionally, by responding to input at client devices 40, network appliance 20 may also be all to set the refresh interval to more accurately serve the current needs of users. Furthermore, by adjusting the refresh interval based on a user priority associated with a user of a particular client device 4, network appliance 20 may also be able to provide differentiated quality of service to two or more client devices 40.

Client devices 40 provide users access to content generated, retrieved, or stored by network appliance 20, for example, by loading status information 50 generated by network appliance 20. Client devices 40 may represent personal computer(s), web-enabled personal data assistants (PDAs), internet protocol (IP) telephones, or any other suitable communication device capable of retrieving information from network appliance 20. In particular embodiments, client devices 40 may also be capable of accepting input from users and communicating the input to network appliance 20. In general, client devices 40 may include any combination of hardware and/or software suitable for providing the functionality described below. For example, in a particular embodiment, client device 40 hosts a browser application operable to load status information 50 from network appliance 20 and display content from the status information 50 to a user.

Network appliance 20 generates, stores, retrieves status information 50 and/or forwards status information 50 to client devices 40 in response to status requests from client devices 40. Network appliance 20 may represent a conventional server, a collection of servers, a personal computer ("PC"), or any other suitable component capable of obtaining, hosting, or serving status information 50 and/or communicating status information 50 to client devices 40 over network 30. Although, for the sake of simplicity, the description below describes network appliance 20 as "generating" status information 50 and updated status information 55, network appliance 20 may generate status information, retrieve status information from remote components, access status information stored in a local memory, and/or obtain status information 50 and updated status information 55 in any other suitable manner. Additionally, network appliance 20 may represent an appliance that receives status information 55 destined for client device 20 and modifies status information 55, such as by altering refresh intervals included in status information 55. After modification, network appliance 20 may transmit status information 55 to client device 40. Alternatively, network appliance 20 may represent a component or module of client device 40 operable to generate refresh intervals for client device 40.

Network 30 represents any hardware and/or software configured to communicate information in the form of packets, cells, frames, segments, or other portions of data. Network 30 may include routers, hubs, switches, gateways, or any other suitable components in any suitable form or arrangement. Network 30 may also include any combination of public or private communications equipment such as elements of a public switched telephone network (PSTN), a global computer network such as the Internet, a local area network (LAN), a wide area network (WAN), a Personal Area Network (PAN), a Local Operating Network (LON), or other appropriate communications equipment.

Status information 50 and updated status information 55 represent files, messages, or other forms of electronic information suitable for communication to client devices 40 over network 30. For example, status information 50 may represent eXtensible Markup Language (XML) and/or Hyper-Text Markup Language (HTML) files generated by network appliance 20. Moreover, status information 50 may be transmitted to client device 40 as a plurality of files, messages datagrams, packets, and/or any other suitable arrangement of information. For example, network appliance 20 may transmit status information 50 to client device 40 as a plurality of Internet Protocol (IP) packets. Client device 40 may then reconstruct an HTML file from the IP packets and display the HTML file to a user of client device 40.

Each set of status information 50 and updated status information 55 may additionally specify a refresh interval. The refresh interval indicates to a particular client device 40 receiving status information 50 a time period after which that particular client device 40 should request updated status information 55 from network appliance 20. In a particular embodiment, status information 50 and updated status information 55 represent HTML files and the refresh interval is specified in a header of the HTML files. In general, status information 50 and any one or more sets of updated status information 55 may include identical information, vary only in refresh interval, or represent substantially different collections of information.

In operation, client device 40 transmits a status request to network appliance 20. The status request may represent any form of communication appropriate for client device 20 to request information from network appliance 20 based on the configuration of communication system 10. For example, in a particular embodiment, the status request may represent an HTTP request, such as a "POST" or "GET" request.

In response to the status request, network appliance 20 determines a refresh interval. This process is described in more detail below with respect to FIG. 2. Network appliance 20 then generates status information 50. Status information 50 specifies the refresh interval and may include additional content requested by the user. Network appliance 20 then communicates status information 50 to client device 40.

After receiving status information 50, client device 40 may provide information in status information 50 to a user of client device 40. For example, if status information 50 represents an HTML file, client device 40 may display contents of the HTML file on a screen of client device 40. Client device 40 also begins timing the refresh interval.

Client device 40 sends, at a time determined based on the refresh interval, another status request to network appliance 20 requesting updated status information 55. For example, client device 40 may send another status request to network appliance 20 requesting updated status information 55 when the refresh interval expires. Alternatively, client device 40 may predict the expiration of the refresh interval and transmit another status request slightly before the refresh interval expires. As another example, client device 40 may monitor the timing of the refresh interval periodically and may not detect the expiration of the refresh interval until slightly after expiration occurs. In such an embodiment, client device 40 may transmit another status request slightly after expiration of the refresh interval. In general, client device 40 may transmit another status request at any appropriate time based on the refresh interval.

When the refresh interval has expired, client device 40 sends another status request to network appliance 20 requesting updated status information 55. Network appliance 20 then determines a refresh interval for updated status information 55. Depending on the circumstances, as discussed further below, network appliance 20 may or may not determine a refresh interval for updated status information 55 that is different from the refresh interval determined by network appliance 20 for status information 50. Network appliance 20 generates updated status information 55 that specifies this refresh interval. As discussed above, updated status information 55 may be identical to status information 50, differ only in the specified refresh interval, or may be substantially different from status information 50 in both refresh interval and information content. Network appliance 20 then communicates updated status information 55 to client device 40.

This process may be repeated indefinitely with client device 40 sending another status request at the expiration of the refresh interval specified in the most recently received updated status information 55. Moreover, depending on relevant factors, the refresh interval specified by subsequent versions of updated status information 55 may differ from the refresh interval specified by status information 50 and/or updated status information 55. By adjusting the refresh interval specified by status information 50, network appliance 20 can control the frequency with which client device 40 requests updated status information 55. Network appliance 20 may set a refresh interval that limits a network load experienced by network appliance 20 but still provides client device 40 with sufficiently updated information. Furthermore, particular embodiments of network appliance 20 are capable of adjusting the refresh interval based on input from client devices 40, as described in more detail with respect to FIGS. 2 and 3.

Additionally, although the above discussion describes an embodiment of communication system 10 that determines refresh intervals when a status request is received, network appliance 20 may instead determine a new refresh interval in response to events occurring on communication system 10 and then store the new refresh interval until the next status request. When client device 40 subsequently sends network appliance 20 a status request, network appliance 20 retrieves the new refresh interval and generates updated status information 55 that includes the new refresh interval. After generating updated status information 55, web server transmits updated status information 55 to client device 40 as described above. In general, network appliance 20 may generate a new refresh interval at any appropriate time based on the configuration of communication system 10.

Although the description below focuses, for the purpose of illustration, on a particular embodiment of communication system 10 in which network appliance 20 represents a web server that determines the refresh interval during generation of status information 55, network appliance 20 may represent any appropriate device capable of providing the refresh interval to client device in any appropriate manner. For example, as noted above, network appliance 20 may represent a forwarding engine that receives status information 55 from another element on network 30. Network appliance 20 may then modify a refresh interval included in status information 55 or incorporating a refresh interval in status information 55 before transmitting status information 55 to client device 40.

Additionally, network appliance 20 may also represent a module or component of client device 40. For example, network appliance 20 may represent an interface of client device 20 that receives status information 55 and modifies refresh intervals of status information 55 or adds refresh intervals to status information 55. Alternatively, network element 20 may represent a component of client device 40 that generates refresh intervals for client device 20 independent of the receipt of status information 55.

Figure 2:
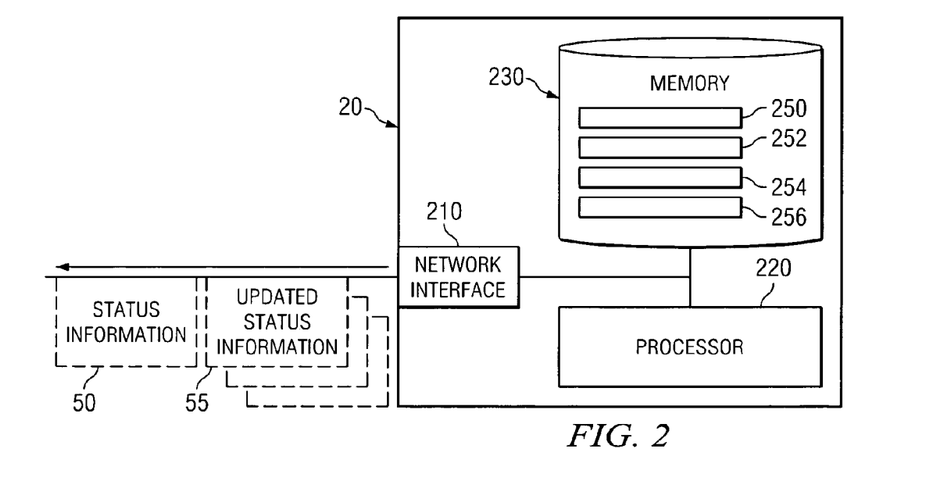
FIG. 2 is a block diagram illustrating details of the web server of FIG. 1, in accordance with a particular embodiment of the present invention.

FIG. 2 is a block diagram showing detailed components of network appliance 20, according to a particular embodiment. Network appliance 20 includes a processor 220, a memory 230, and a network interface 210. Processor 220 generates, obtains, or otherwise acquires status information 50 and updated status information 55 using information stored in memory 230 and communicates status information 50 and updated status information 55 to client devices 40 through network interface 210.

Processor 220 may be a general purpose computer, dedicated microprocessor, or other processing device capable of generating and communicating electronic information. Examples of processor 220 include application-specific integrated circuits (ASICs), field-programmable gate arrays (FPGAs), digital signal processors (DSPs) and any other suitable specific or general purpose processors.

Memory 230 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices.

Network interface 210 receives status requests from client devices 40 and transmits status information 50 and updated status information 55 to client devices 40. In a particular embodiment processor 220 provides, in whole or in part, the functionality of interface 210, and interface 210 and processor 220 represent the same component. In general, network interface 210 may include any combination of hardware and/or software suitable for providing the functionality described below.

In operation, network interface 210 receives a status request from client device 40. As noted above, the status requests may represent HTTP requests or communication of any other form appropriate for requesting information from network appliance 20. Network interface 210 communicates the status request to processor 220 or otherwise notifies processor 220 that network interface 210 received the status request.

In accordance with a particular embodiment, in response to receiving the status request, processor 220 determines a refresh interval. Processor 220 may determine the refresh interval based on a default interval stored in memory 230, a previous refresh interval stored in memory 230, a priority level associated with a user of client device 40, a number of client devices 40 currently requesting status information 50 from network appliance 20, input received from client device 40, network activity on communication system 10 and/or any other suitable dynamic or predetermined factor, consideration, or circumstance. In a particular embodiment, processor 220 determines a refresh interval of thirty seconds for status information 50.

Figure 3:
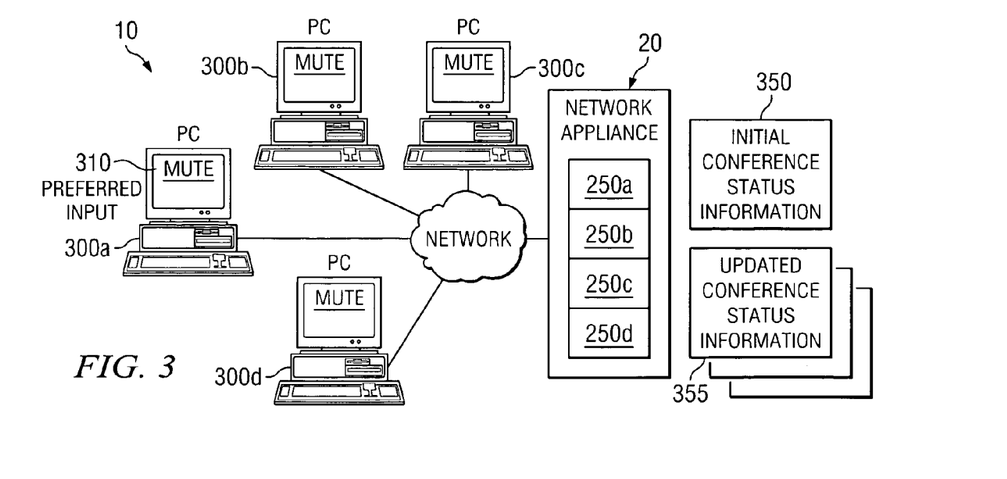
FIG. 3 illustrates an example of the operation of the communication system in accordance with a particular embodiment of the present invention.

As one example, processor 220 may adjust the refresh interval based on an input received from client device 40. Network appliance 20 may determine that a user of client device 40 has activated an input of client device 40 and determine the refresh interval based on activation of the input. For example, processor 220 may determine that activation of the input warrants network appliance 20 more frequently updating status information 50 provided to client device 40. Processor 220 may select a shorter refresh interval as a result. FIG. 3 illustrates an example of this process.

As another example, processor 220 may determine the refresh interval based on a network load on communication system 10. The network load may represent a number of requests detected by network appliance 20 for all status information 50 offered by network appliance 20, a number client devices 40 that have requested status information 50 within a predetermined time period, a measure of information currently being exchanged on network 30, a number of users currently logged-in on communication system 10, or any other appropriate measure of the load on communication system 10, or any one or more components of communication system 10. Based on the network load, processor 220 may then select a refresh interval that limits the estimated number of status requests that network appliance 20 will receive for updated status information 55 over a predetermined period of time. For example, network appliance 20 may be configured to maintain an average of ten status requests a minute for status information 50. Thus, if five users are presently requesting status information 50 and updated status information 55 from network appliance 20, network appliance 20 may select a refresh interval of thirty seconds for all status information generated. When the number of users grows to ten, network appliance 20 may then select a new refresh interval of one minute to limit the number of status requests network appliance 20 receives per minute.

As yet another example, processor 220 may detect a change in an update rate associated with information included in 50 and determine the refresh interval based on the change in update rate. For example, where status information 50 provides client device 40 with stock prices or scores from a sporting event, processor 220 may detect a period of heavy trading or the start of halftime, respectively, which may affect the rate at which the relevant information will change. In general, processor 220 may be configured to detect any increases or decreases in the rate at which information associated with status information 50 and updated status information 55 is changing and to adjust the refresh interval accordingly. For example, processor 220 may select a greater refresh interval during periods of low trading or during halftime because the stock prices and scores, respectively, are not changing and the information provided to client device 40 in previous status information 50 does not need to be updated.

As another example, processor 220 may determine the refresh interval based on a user priority associated with client device 40 or with a user of client device 40. In a particular embodiment, one or more client devices 40 may have an associated user priority. By adjusting the refresh interval based on the user priority, particular embodiments of network appliance 20 may provide differentiated quality of service to client devices 40. For example, network appliance 20 may generate status information 50 as part of a conference call between client devices 40. Each user of a client device 40 may be designated as an administrator or a participant of the conference call. Network appliance 20 may then determine the refresh interval based on the user priority associated with a client device 40 requesting status information 50 or updated status information 55. Network appliance 20 may provide the administrator with shorter refresh intervals and, as a result, improve quality of service during the conference call. In particular embodiments, the user priority may designate a particular user as an internal user or an external user with respect to an entity that operates network appliance 20, as a preferred user or a normal user, or may classify client devices 40 or users of client devices 40 in any other appropriate manner.

As yet another example, processor 220 may determine the refresh interval based on a request type of the status request.

For example, processor 220 may be configured to identify the processing bandwidth that will be used to respond to a particular type of status request based on, for example, the particular status information 50 requested, the type of application requesting status information 50, or any other appropriate factor. Processor 220 may select a longer refresh interval for status requests with significant processing needs and/or a shorter refresh interval for status requests with minimal processing needs. In general, processor 220 may determine the refresh interval based on any other suitable type, categorization, and/or characteristic of the status request.

Additionally, processor 220 may determine the refresh interval based on a plurality of these factors, considerations, and/or circumstances. For example, processor 220 may identify a user priority for a user of client device 40, such as, for conference call applications, administrator or participant. The user priority may identify any appropriate classification or characteristic of the user of client device 40. When processor 220 receives a status request from that particular client device 40 processor may determine the refresh interval based on both the user priority associated with client device 40 and the network load on communication system 10. As a result, if the network load exceeds a maximum value, processor 220 may increase the refresh interval for a particular client device 40 associated with a participant but may not determine a new refresh interval for a particular client device 40 associated with an administrator of communication system 10.

In a particular embodiment, determining the refresh interval may include reading a refresh interval from a particular location in memory 230. For example, processor 220 may determine the refresh interval by reading a value from a current interval address 250 of memory 230. In such a case, processor 220 may then modify the refresh interval by reading a new value from a predetermined address in memory 210 and writing the new value to current interval address 250. For example, processor 220 may respond to an increase in the network load on communication system 10 by reading a heavy load interval from a heavy load address 256 in memory 230 and writing the heavy load interval to current interval address 250.

After determining the refresh interval, processor 220 generates status information 50, which specifies the refresh interval. In a particular embodiment, processor 220 hosts a common gateway script (CGI) script that determines the refresh interval and generates status information 50. Processor 220 communicates status information 50 to network interface 210. Network interface 210 then communicates status information 50 to client device 40. As noted above, processor 220 may repeat this process indefinitely as processor 220 receives additional status requests.

FIG. 3 illustrates operation of an example embodiment of communication system 10. In the illustrated embodiment, client devices 40 are represented by personal computers (PCs) 300 that support Voice over IP (VoIP) telephonic communication between a plurality of users and an administrator. In the illustrated example, network appliance 20 hosts a telephonic conference for PCs 300 using conventional VoIP techniques and generates initial conference status information 350 and updated conference status information 355. For purposes of illustration, operation is described with respect to a particular PC 300, PC 300a.

In this embodiment, initial conference status information 350 and updated conference status information 355 represent HTML files that graphically convey conference status information to PCs 300, including a count of active participants, names and titles of active participants, a mute status of a particular PC, and/or any other suitable status information. As conference status information changes updated conference status information 355 provide updated conference status information.

Additionally, in the illustrated embodiment, predetermined locations in memory 230, specifically default interval address 252 and preferred interval address 254, store values for refresh intervals to be used in response to particular events occurring on communication system 10, as described further below. Moreover, network appliance 20 generates initial conference status information 350 and updated conference status information 355 for a particular PC 300a-d using the value currently stored in a current interval address 250a-d associated with the requesting PC 300a-d. Thus, by reading values from particular locations in memory 210 and writing these values to current interval address 250a, network appliance 20 can adjust the refresh interval used in initial conference status information 350 and updated conference status information 355.

In operation, network appliance 20 may initiate a conference call between PCs 300 using conventional methods or any other suitable techniques. In initiating the conference call, network appliance 20 establishes a VoIP channel between PCs 300a-d. Network appliance 20 also reads a default interval value from default interval address 252 in memory 230 and writes the value to current interval address 250a. In the illustrated embodiment, the default interval value is one minute.

PC 300a requests and receives an initial conference status information 350 that network appliance 20 generates for that PC 300. As noted above, network appliance 20 generates an initial conference status information 350 that contains conference status information, including the names and titles of conference participants and the mute status of each participant. Furthermore, initial conference status information 350 specifies a first refresh interval based on the value stored in current interval address 250a.

After generating an initial conference status information 350 for PC 300a, network appliance 20 transmits initial conference status information 350 to PC 300a. PC 300a may display information included in initial conference status information 350 to a user of PC 300a. PC 300a also begins timing the refresh interval. Meanwhile, users of PCs 300 communicate with one another using a voice channel established between PCs 300. When PC 300a determines that the refresh interval has expired, PC 300a requests an updated conference status information 355 from network appliance 20. Network appliance 20 generates updated conference status information 355, which again specifies a refresh interval based on the value stored in current interval address 250a and communicates updated conference status information 355 to PC 300a. This process may continue indefinitely.

During the conference call, network appliance 20 adjusts the refresh interval specified in updated conference status information 355 based on the activation of a preferred input 310 of PC 300. Depending on the configuration of communication system 10, examples of preferred input may include, but are not limited to, inputs associated with mute, disconnect, or other features provided by PC 300a. In the illustrated embodiment, preferred input 310 represents a hyperlink associated with a mute feature of PCs 300. The user of a particular PC 300 may activate the mute feature for that PC 300 by clicking on the hyperlink.

In response to detecting the activation of preferred input 310, network appliance 20 reads a preferred interval value from a preferred interval address 254 in memory 230 and stores the preferred interval value in current interval address 250a. In the illustrated embodiment, the preferred interval value is assumed to be five seconds.

When PC 300a transmits a status request to network appliance 20 after network appliance 20 detects activation of the preferred input, network appliance 20 again generates updated conference status information 355 specifying a refresh interval based on the value in current interval address 250a. Because current interval address now holds preferred interval value, updated conference status information 355 will specify a shorter refresh interval. As a result, PC 300a will send status requests more often and update conference status information provided to the user more frequently.

Network appliance 20 may later decide to return to the original refresh interval. For example, after detecting activation of preferred input 310, network appliance 20 may then monitor elements of network appliance 20, PC 300a, and other components of communication system 10 to determine when a service feature associated with preferred input 310 is activated. When network appliance 20 detects the activation of the service feature, network appliance 20 may read the default interval value from default interval address 252 and store the default interval value in current interval address 250a. When PC 300a sends a status request to network appliance 20 after network appliance 20 detects the activation of the service feature, network appliance 20 generates updated conference status information 355, which specifies a refresh interval based on the default interval value. In doing so, network appliance 20 adjusts the rate at which PC 300a updates conference status information back to the original rate.

For example, if the user chooses to initiate a separate conversation and activates a mute input of PC 300a, such as by clicking the hyperlink associated with a mute feature, activation of the mute feature may take a non-trivial amount of time depending on the network load and other factors. The user may choose to remain silent until certain that the mute feature has been activated. However, the user may not wish to stay silent any longer than necessary. Thus, the user may desire updates more frequently than normal during this period, so that the user may be informed as soon as possible that the mute feature has been successfully activated. By setting the refresh interval in updated conference status information 355 to the preferred refresh interval, network appliance 20 causes PC 300a to submit status requests to network appliance 20 more frequently. Thus, the conference status information that the user receives is updated more frequently as the user desires.

Continuing with the mute example, network appliance 20 may then monitor elements of network appliance 20 and/or other components of communication system 10 to determine when the mute feature is activated for PC 300a. If PC 300a submits a status request to network appliance 20 after network appliance 20 determines that the mute feature has been activated, network appliance 20 may then transmit to PC 300a updated conference status information 355 that includes updated conference status information indicating that the mute feature of PC 300a has been activated. Updated conference status information 355 also specifies the default refresh interval, and thus, the rate at which PC 300a updates conference status information will return to the default rate.

Figure 4:
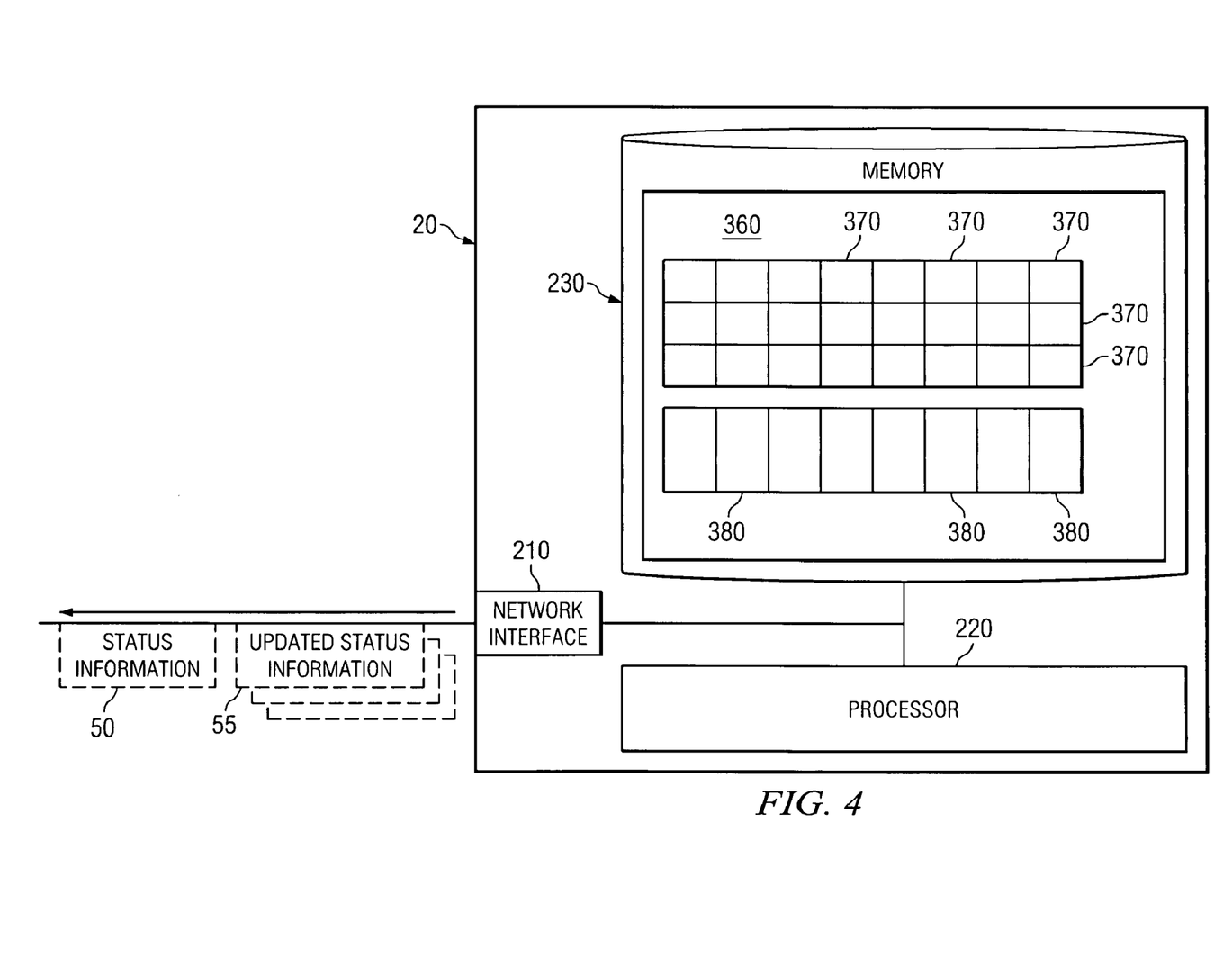
FIG. 4 is a block diagram illustrating details of the web server, in accordance with a particular embodiment of the present invention.

FIG. 4 also illustrates operation of an example embodiment of communication system 10. In addition to adjusting refresh intervals to change the frequency at which client devices 40 request updated status information 55, particular embodiments of communication system 10 may adjust refresh intervals to change the timing of status requests. In the illustrated embodiment, network appliance 20 stores information, previous interval information 360, describing the refresh intervals included in status information 50 and updated status information 55 previously transmitted to client devices 40. In response to a status request, network appliance 20 determines a refresh interval based on previous interval information 360. Previous interval information 360 may represent expiration times associated with previously generated refresh intervals, counters specifying a number of refresh intervals set to expire during a particular time period, or any other appropriate information describing previously generated refresh intervals. FIG. 4 illustrates an embodiment of communication system 10 that generates refresh intervals based on previous interval information 360 and includes network appliance 20 and a plurality of client devices 40.

In operation, in this embodiment, network appliance 20 receives a status request from a particular client device 40. In response to the status request, network appliance 20 generates a refresh interval. Network appliance 20 may generate the refresh interval based, at least in part, on previous interval information 360. Furthermore, network appliance 20 may generate the refresh interval based in any appropriate manner on previous interval information 360. After generating the refresh interval, network appliance 20 may transmit status information 50 that includes the refresh interval to client device 20 as discussed above.

As an example of how network appliance 20 may utilize previous interval information 20 during operation, network appliance 20 may store expiration times for the refresh intervals included in status information 50 and updated status information 55 transmitted by network appliance 20. The expiration times represent any suitable time value determined based on the magnitude of the previously generated refresh intervals. As a result, each expiration time may specify an expected expiration time for a previously generated refresh interval, an expected delivery time for a status request received as a result of the expiration of a previously generated refresh interval, or any other suitable time value determined based on a previously generated refresh interval.

In the illustrated embodiment, server 20 stores these expiration times as stored expiration times 370. Network appliance 20 may then determine refresh intervals for status requests based on stored expiration times 370 in an effort to more evenly schedule the future status requests. For example, when network appliance 20 receives a status request, network appliance 20 may generate a default refresh interval as described above with respect to FIG. 2. Network appliance 20 may also determine a default expiration time that identifies the expiration time of that default refresh interval. Network appliance 20 may then compare the default expiration time to stored expiration times 370. If more than a predetermined number of stored expiration times 370 fall within a predetermined time range of the default expiration time, network appliance 20 may determine a new refresh interval.

As an illustration, assume the default refresh interval is thirty seconds, the maximum value is ten, and the predetermined range is one second. Thus, in response to status requests, network appliance 20 determines a default refresh interval that has a default expiration time thirty seconds later. Network appliance 20 then compares the default expiration time to stored expiration times 370 to determine whether ten or more of stored expiration times 370 are within one second of the default expiration time or, in other words, if ten or more of stored expiration times 370 are associated with refresh intervals that will expire between twenty-nine to thirty-one seconds from that point. If so, network appliance 20 may generate a new refresh interval with a new expiration time.

As another example, network appliance 20 may store previous interval information 360 that includes a plurality of counters 380. Each counter 380 may be associated with a particular time range and may represent a number of status requests that network appliance 20 expects to receive during the time range associated with counter 380. Counters 380 may be associated with a time range defined relative to the current time or based on a range of absolute time values. For example, in a particular embodiment, a particular counter 380 may be assigned to track a number of status information 50 that have been transmitted with refresh intervals five to seven seconds from the current time or another suitable reference time, and another counter 380 may be assigned to track a number of status information 50 that have been transmitted with refresh intervals from seven to nine seconds from the current time. Additional counters 380 may be assigned to track other time ranges. In general, network appliance 20 may have any suitable number of counters 380 assigned to track any suitable size and number of time ranges. In a particular embodiment, network appliance 20 maintains counters 380 associated with 250 millisecond time ranges, with sufficient counters 380 to span a two-minute time period.

When network appliance 20 receives a status request, network appliance 20 may generate a refresh interval based on counters 380. In a particular embodiment, network appliance 20 generates a default refresh interval, as described above with respect to FIG. 2. In generating the default refresh interval, network appliance 20 may consider user priority, current network load, the processing demands of the status request, or any other appropriate factors, as discussed above.

After generating the default refresh interval, network appliance 20 compares the default refresh interval to a particular counter 380 associated with expiration times similar to that of the default refresh interval. For example, if network appliance 20 generates a default refresh interval of thirty seconds and counters 380 are configured to monitor 250 millisecond ranges, network appliance 20 may access a count of a particular counter 380 associated with a "30-30.25 seconds" range, representing the number of previously transmitted status information 50 that included a refresh interval set to expire in the next 30 to 30.25 seconds. Network appliance 20 may then use the count of the relevant counter 380 in any appropriate way to determine an appropriate refresh interval for the current status request.

In a particular embodiment, network appliance 20 determines whether the count of the appropriate counter 380 is greater than a maximum value. If so, network appliance 20 may adjust the default refresh interval in any appropriate manner. Depending on the configuration of network appliance 20, network appliance 20 may increment or decrement default refresh interval in a suitable manner to generate a new refresh interval with a new expiration time. In a particular embodiment, web server may determine whether to increment or decrement based on the type of status request. If the status request requested a particular status information 50 associated with a shorter refresh interval, network appliance 20 may decrement the refresh interval. Alternatively, if the status request requested a particular status information 50 associated with a longer refresh interval, network appliance 20 may increment the refresh interval. In general, however, network appliance 20 may determine an adjustment for the refresh interval in any appropriate manner.

In a particular embodiment, network appliance 20 may then compare the new refresh interval to a second counter 380 associated with expiration times similar to that of the new refresh interval. If the second counter 380 is also greater than a maximum value, network appliance 20 may then repeat the process generating a third refresh interval by again incrementing or decrementing the new refresh interval.

Network appliance 20 may repeat this process until network appliance 20 identifies a refresh interval associated with a particular counter 380 having a count less than the maximum value. Alternatively, network appliance 20 may increment or decrement the refresh interval over a limited range and, if network appliance 20 is unable to identify a counter 380 within that range that also has a value below the maximum value, network appliance 20 may use a refresh interval associated with the counter 380 having the lowest value. For example, network appliance 20 may increment or decrement the refresh interval up to a predetermined percentage of the default refresh interval and then choose the refresh interval within that adjustment range that is associated with the lower counter value.

After determining an appropriate refresh interval, network appliance 20 may adjust the particular counter 380 associated with the chosen refresh interval. More specifically, network appliance 20 may determine an expiration time associated with the chosen refresh interval and then identify a counter 380 associated with that expiration time. For example, if network appliance 20 used the thirty-second refresh interval discussed above, network appliance 20 may increment the counter 380 associated with the "30-30.25 second" time range. Moreover, network appliance 20 may increment the appropriate counter 380 by one or may increment the counter by a weighted increment based on the type of status request received and/or on any other suitable factors. For example, if network appliance 20 determines that the status request is associated with a status information 50 that requires significant computing power to generate and/or transmit, network appliance 20 may increment the appropriate counter 380 by a first amount. If network appliance 20 determines that the status request is associated with a status information 50 that requires minimal computing power to generate and/or transmit, network appliance 20 may increment the appropriate counter 380 by a second amount, with the second amount being less than the first amount. Thus, network appliance 20 may be able to adjust counters 380 to accurately predict the processing bandwidth expected to be used to respond to status requests in each of the upcoming time periods.

After determining a refresh interval and adjusting the appropriate counter 380, network appliance 20 transmits status information 50 that includes that refresh interval to the requesting client device 40. As discussed above, network appliance 20 may generate this status information 50, retrieve this status information 50 from memory 230, or acquire this status information 50 in any other appropriate manner.

At appropriate times, network appliance 20 may, depending on the configuration of network appliance 20, update counters 380 to reflect the passage of time. For example, counters 380 may be adjusted at intervals set based on the time ranges covered by each counter 380. If counters 380 are configured to measure expiration times associated with a 250 millisecond range, network appliance 20 may update web counters 380 every 250 milliseconds and may adjust the counters by associating each counter 380 with a new time range without adjusting the count of any counters 380. Thus, network appliance 20 may retain the count of the 30-30.25 second counter but associate that counter with the 29.75-30 second time range. In a particular embodiment, network appliance 20 may store counters 380 in a circular buffer in memory 230 and maintain a pointer to the first counter in the buffer. Network appliance 20 may then advance the pointer at appropriate times, such as, for this example, every 250 milliseconds.

Alternatively, network appliance 20 may maintain stored expiration times 370, as described above, and may adjust counters 380 as particular stored expiration times 370 move into and out of the range associated with each counter 380. For example, for the 30-30.25 second counter described above, network appliance 20 may, at appropriate times, access stored expiration times 370 to identify previously generated refresh intervals that are no longer set to expire between 30-30.25 seconds in the future and decrement the 30-30.25 second counter appropriately. Network appliance 20 may also access stored expiration times 370 to identify previously generated refresh intervals that are now set to expire 30-30.25 seconds in the future and increment the 30-30.25 second counter appropriately. Network appliance 20 may repeat this process for all counters 380 resulting in a series of changes as all previously generated refresh intervals move closer to expiration.

Thus, particular embodiments of network appliance 20 may allow communication system 10 to provide improved communication service by predicting and accounting for future status requests in generating refresh intervals. More specifically, particular embodiments of web server are capable of smoothing the distribution of status requests by generating refresh intervals based on previously generated refresh intervals. Although this description presents particular methods for storing and maintaining information on previously generated refresh intervals, particular embodiments of network appliance 20 may store, update, and utilize previous interval information 360 in any appropriate manner.

Figure 5:
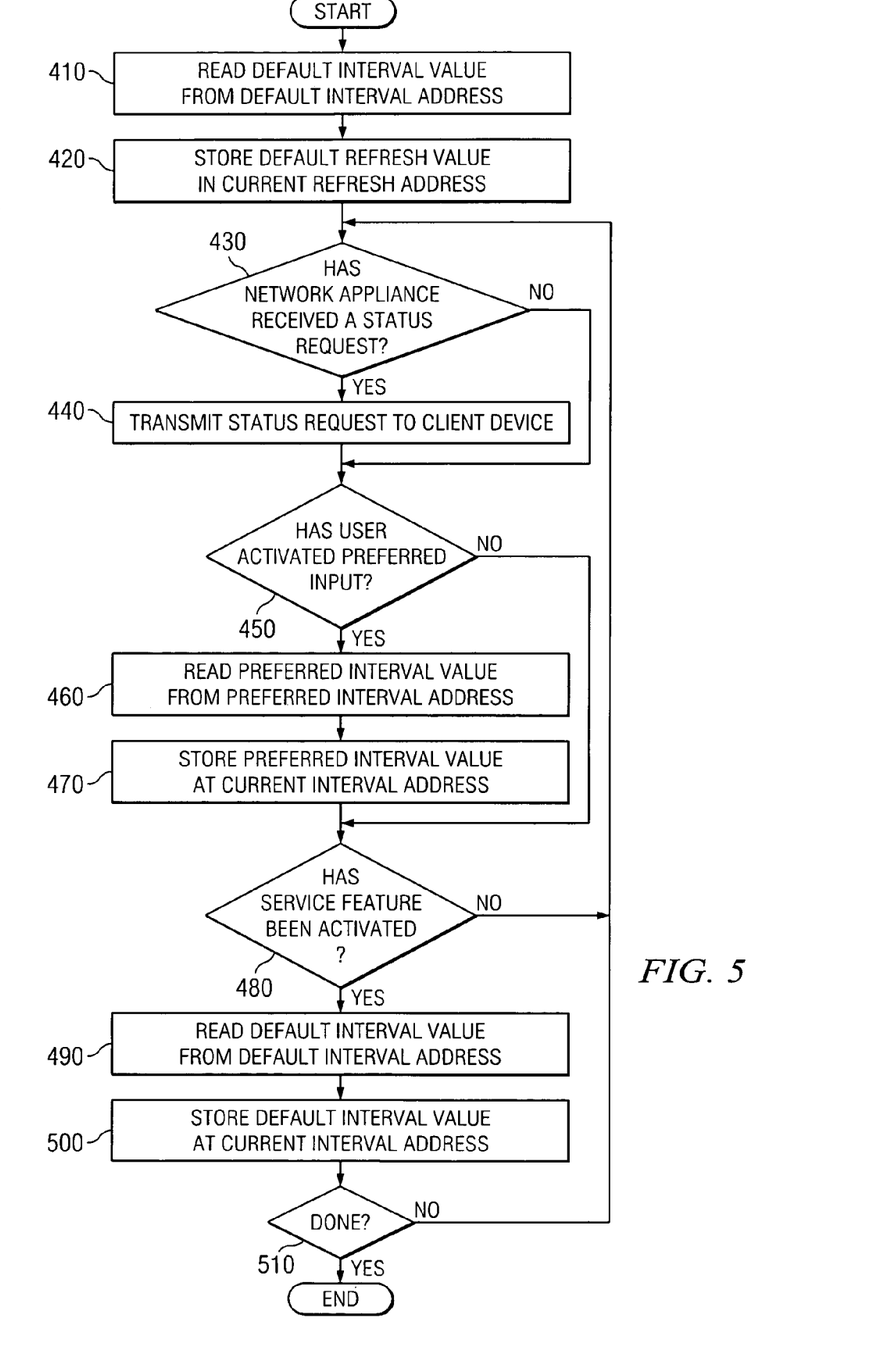
FIG. 5 is a flow diagram illustrating a method for providing information to a client device, in accordance with particular embodiment of the present invention.

FIG. 5 is a flowchart illustrating operation of network appliance 20 according to a particular embodiment. In the illustrated embodiment, network appliance 20 adjusts refresh interval in response to the activation of preferred input 310 associated with a client device 40.

At step 410, network appliance 20 reads a default interval value from default interval address 252. Network appliance 20 stores the default interval value in current interval address 250 at step 420. In a particular embodiment, the default interval value corresponds to a refresh interval of thirty seconds. At step 430, network appliance 20 determines whether network appliance 20 has received a status request from client device 40. If network appliance 20 has received a status request, network appliance 20 transmits to client device 40 a status information 50 that includes a refresh interval based on the value stored in current interval address 250 at step 440. As noted above, network appliance 20 may generate, read, or otherwise acquire status information 50 in any appropriate manner before transmitting status information 50 to client device 40.

At step 450, network appliance 20 determines whether the user has activated preferred input 310. If the user has activated preferred input 310, network appliance 20 reads the preferred interval value from preferred interval address 254 at step 460. Network appliance 20 stores the preferred interval value in current interval address 250 at step 470.

At step 480, network appliance 20 determines whether a service feature associated with a preferred input 310 has been activated. If the service feature has been activated, network appliance 20 reads the default interval value from default interval address 252 at step 490. At step 500, network appliance 20 stores the default interval value in current interval address 250. Network appliance 20 then determines whether the process is done at 510. If so, network appliance 20 returns to step 430. If not, network appliance 20 ends the process.

Figure 6:
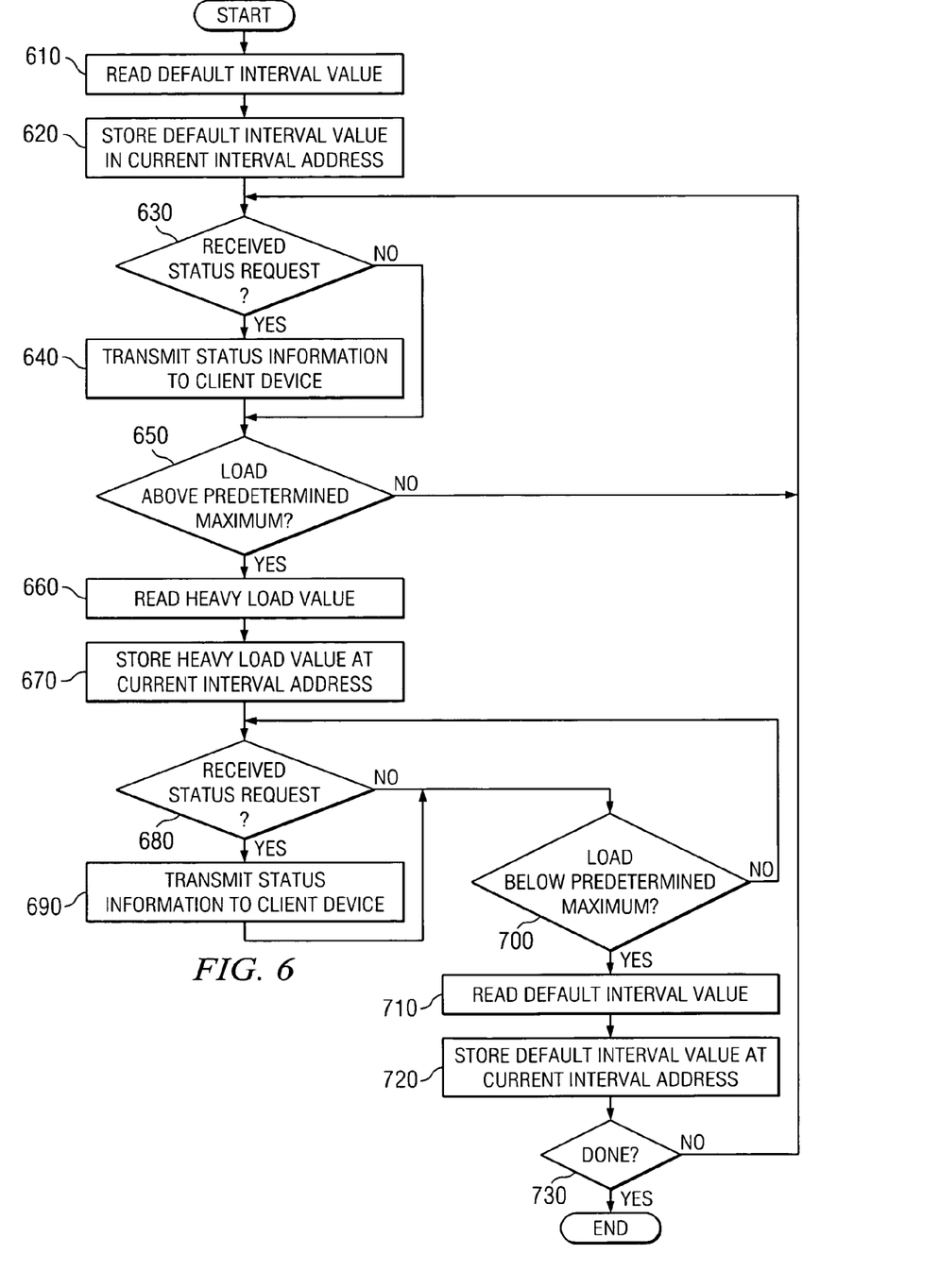
FIG. 6 is a flow diagram illustrating a method for providing information to a client device, in accordance with particular embodiment of the present invention.

FIG. 6 is a flowchart illustrating operation of network appliance 20 according to a particular embodiment. In the illustrated embodiment, network appliance 20 adjusts the refresh interval in response to the network load. In particular, network appliance 20 adjusts the refresh interval if the network load exceeds a maximum value.

At step 610, network appliance 20 reads the default interval value from default interval address 252. At step 620, network appliance 20 stores default interval value in current interval address 250.

At step 630, network appliance 20 determines whether network appliance 20 has received a status request from client device 40. If network appliance 20 has received a status request, network appliance 20 transmits to client device 40 a status information 50 that includes a refresh interval based on the value stored in current interval address 250 at step 640. As noted above, network appliance 20 may generate, read, or otherwise acquire status information 50 in any appropriate manner before transmitting status information 50 to client device 40.

At step 650, network appliance 20 determines whether the network load has increased above the maximum value. If the network load has not increased above the maximum value, network appliance 20 returns to step 630. If the network load has increased above the maximum value, network appliance 20 reads a heavy load value from heavy load address 256 at step 660. Network appliance 20 stores the heavy traffic value in current interval address 250 at step 670.

Additionally, network appliance 20 determines whether network appliance 20 has received a status request from client device 40 at step 680. If network appliance 20 has received a status request, network appliance 20 transmits to client device 40 status information 50 that includes a refresh interval based on the value stored in current interval address 250 at step 690.

At step 700, network appliance 20 determines whether the network load has decreased below the maximum value. If the network load has decreased below the maximum value, network appliance 20 returns to step 610. If the network load has not decreased below the maximum value, network appliance 20 reads the default interval value from default interval address 252 at step 710. At step 720, network appliance 20 stores default interval value in current interval address 250. At step 730, network appliance 20 determines, at step 730, whether to terminate operation. If so, network appliance 20 returns to step 630. If not, network appliance 20 ends the process.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. For example, although the above description focuses on an embodiment of communication system 10 that utilizes a particular network appliance 20 to generate refresh intervals according to the provided methods, the refresh intervals may also be generated by an external flow handler that intercepts and rewrites refresh intervals in transmitted status information 50, by a dedicated application running on network appliance 20, by an interface provided to client devices 40 for requesting refresh intervals, and/or by other suitable components or combinations of such using the described methods.

What is claimed is:

1. A method of providing information to a client device comprising:
   receiving, at a server, a status request from a client device;
   determining, at said server, a default refresh interval;
   determining, at said server, a number of clients due for a refresh within a predetermined time interval, the predetermined time interval including the expiration of the default refresh interval;
   setting, at said server, a refresh interval based on the default refresh interval, if the number of clients due for a refresh within the predetermined time interval is not greater than a maximum value;
   determining, at said server, an adjusted refresh interval, if the number of clients due for a refresh within the predetermined time interval is greater than the maximum value;
   setting, at said server, the refresh interval for at least a portion of the clients based on the adjusted refresh interval, if the number of clients due for a refresh within the predetermined time interval is greater than the maximum value, wherein setting the refresh interval based on the adjusted refresh interval results in the number of clients due for a refresh to be less than the maximum value within the predetermined time interval; and
   communicating status information to the client device in response to the status request, wherein the status information specifies the refresh interval.

2. The method of claim 1, wherein setting the refresh interval based on the default refresh interval further comprises:
   setting the refresh interval based on the default refresh interval; and
   incrementing the counter associated with the expiration time of the default refresh interval.

3. The method of claim 2, wherein the counter comprises a first counter and the method further comprising maintaining a plurality of counters, each counter associated with a time range, and wherein setting the refresh interval based on the adjusted refresh interval comprises:
   setting the refresh interval based on the adjusted refresh interval, if the counter is greater than the maximum value; and
   incrementing a counter associated with an expiration time of the adjusted refresh interval.

4. The method of claim 2, wherein incrementing the counter comprises incrementing the counter by an amount based on a type of the status request.

5. The method of claim 2, wherein incrementing the counter comprises incrementing the counter by an amount based on a processing demand associated with the status request.

6. The method of claim 1, wherein determining an adjusted refresh interval comprises determining an adjusted refresh interval by incrementing the default interval, if the counter is greater than the maximum value.

7. The method of claim 1, wherein determining an adjusted refresh interval comprises determining an adjusted refresh interval by decrementing the default interval, if the counter is greater than the maximum value.

8. A system for providing information to a client device comprising:
   a network appliance configured to:
   receive a status request from a client device;
   determine a default refresh interval;
   determine a number of clients due for a refresh within a predetermined time interval, the predetermined time interval including the expiration of the default refresh interval;

set a refresh interval based on the default refresh interval, if the number of clients due for a refresh within the predetermined time interval is not greater than a maximum value;

determine an adjusted refresh interval, if the number of clients due for a refresh within the predetermined time interval is greater than the maximum value;

set the refresh interval for at least a portion of the clients based on the adjusted refresh interval, if the number of clients due for a refresh within the predetermined time interval is greater than the maximum value, wherein setting the refresh interval based on the adjusted refresh interval results in the number of clients due for a refresh to be less than the maximum value within the predetermined time interval; and communicate status information to the client device in response to the status request, wherein the status information specifies the refresh interval.

9. The system of claim 8, wherein the network appliance is further operable to set the refresh interval based on the default refresh interval by:

setting the refresh interval based on the default refresh interval; and incrementing the counter associated with the expiration time of the default refresh interval.

10. The system of claim 9, wherein the counter comprises a first counter and further comprising a plurality of counters, each counter associated with a time range, and wherein the network appliance is further operable to set the refresh interval based on the adjusted refresh interval by:

setting the refresh interval based on the adjusted refresh interval, if the counter is greater than the maximum value; and incrementing a counter associated with an expiration time of the adjusted refresh interval.

11. The system of claim 9, wherein the network appliance is further operable to increment the counter by incrementing the counter by an amount based on a type of the status request.

12. The system of claim 9, wherein the network appliance is further operable to increment the counter by incrementing the counter by an amount based on a processing demand associated with the status request.

13. The system of claim 10, wherein the network appliance is further operable to determine an adjusted refresh interval by determining an adjusted refresh interval by incrementing the default interval, if the counter is greater than the maximum value.

14. The system of claim 8, wherein the network appliance is further operable to determine an adjusted refresh interval by determining an adjusted refresh interval by decrementing the default interval, if the counter is greater than the maximum value.

15. An apparatus for providing information to a client device comprising:

an interface configured to receive status requests from a client device and to transmit status information to the client device;

a processor configured to:

receive a status request from a client device;

determine a default refresh interval;

determine a number of clients due for a refresh within a predetermined time interval, the predetermined time interval including the expiration of the default refresh interval;

set a refresh interval based on the default refresh interval, if the number of clients due for a refresh within the predetermined time interval is not greater than a maximum value;

determine an adjusted refresh interval, if the number of clients due for a refresh within the predetermined time interval is greater than the maximum value;

set the refresh interval for at least a portion of the clients based on the adjusted refresh interval, if the number of clients due for a refresh within the Predetermined time interval is greater than the maximum value, wherein setting the refresh interval based on the adjusted refresh interval results in the number of clients due for a refresh to be less than the maximum value within the predetermined time interval; and communicate status information to the client device in response to the status request, wherein the status information specifies the refresh interval.

16. The apparatus of claim 15, wherein the processor is further operable to set the refresh interval based on the default refresh interval by:

setting the refresh interval based on the default refresh interval; and incrementing the counter associated with the expiration time of the default refresh interval.

17. The apparatus of claim 16, wherein the counter comprises a first counter and further comprising a plurality of counters, each counter associated with a time range, and wherein the processor is further operable to set the refresh interval based on the adjusted refresh interval by:

setting the refresh interval based on the adjusted refresh interval, if the counter is greater than the maximum value; and incrementing a counter associated with an expiration time of the adjusted refresh interval.

18. The apparatus of claim 16, wherein the processor is further operable to increment the counter by incrementing the counter by an amount based on a type of the status request.

19. The apparatus of claim 16, wherein the processor is further operable to increment the counter by incrementing the counter by an amount based on a processing demand associated with the status request.

20. The apparatus of claim 15, wherein the processor is further operable to determine an adjusted refresh interval by determining an adjusted refresh interval by incrementing the default interval, if the counter is greater than the maximum value.

21. The apparatus of claim 15, wherein the processor is further operable to determine an adjusted refresh interval by determining an adjusted refresh interval by decrementing the default interval, if the counter is greater than the maximum value.

22. A computer program stored on a memory, the computer program executed by a server to perform the steps comprising:

receiving, at said server, a status request from a client device;

determining, at said server, a default refresh interval;

determining, at said server, a number of clients due for a refresh within a predetermined time interval, the predetermined time interval including the expiration of the default refresh interval;

setting, at said server, a refresh interval based on the default refresh interval, if the number of clients due for a refresh within the predetermined time interval is not greater than a maximum value;

determining, at said server, an adjusted refresh interval, if the number of clients due for a refresh within the predetermined time interval is greater than the maximum value;

setting, at said server, the refresh interval for at least a portion of the clients based on the adjusted refresh interval, if the number of clients due for a refresh within the predetermined time interval is greater than the maximum value, wherein setting the refresh interval based on the adjusted refresh interval results in the number of clients due for a refresh to be less than the maximum value within the predetermined time interval; and communicating status information to the client device in response to the status request, wherein the status information specifies the refresh interval.

23. The computer program of claim 22, wherein the computer program is further operable to set the refresh interval based on the default refresh interval by:

setting the refresh interval based on the default refresh interval; and incrementing the counter associated with the expiration time of the default refresh interval.

24. The computer program of claim 23, wherein the counter comprises a first counter and wherein the computer program is further operable to maintain a plurality of counters, each counter associated with a time range, and wherein the computer program is further operable to set the refresh interval based on the adjusted refresh interval by:

setting the refresh interval based on the adjusted refresh interval, if the counter is greater than the maximum value; and incrementing a counter associated with an expiration time of the adjusted refresh interval.

25. The computer program of claim 23, wherein the computer program is further operable to increment the counter by incrementing the counter by an amount based on a type of the status request.

26. The computer program of claim 23, wherein the computer program is further operable to increment the counter by incrementing the counter by an amount based on a processing demand associated with the status request.

27. The computer program of claim 22, wherein the computer program is further operable to determine an adjusted refresh interval by determining an adjusted refresh interval by incrementing the default interval, if the counter is greater than the maximum value.

28. The computer program of claim 22, wherein the computer program is further operable to determine an adjusted refresh interval by determining an adjusted refresh interval by decrementing the default interval, if the counter is greater than the maximum value.

* * * * *